United States Patent

Crandall et al.

[11] Patent Number: 5,929,447
[45] Date of Patent: Jul. 27, 1999

[54] GAMMA CAMERA COLLIMATOR

[75] Inventors: Peter Scott Crandall, Oconomowoc; Daniel Robert Stafford Taylor, Hartland; Floribertus Philippus Martinus Heukensfeldt Jansen, Brookfield, all of Wis.

[73] Assignee: General Electric Company, Milwaukee, Wis.

[21] Appl. No.: 08/853,279

[22] Filed: May 9, 1997

[51] Int. Cl.⁶ .................................................. G01T 1/164
[52] U.S. Cl. ................................. 250/363.1; 250/363.02
[58] Field of Search ........................... 250/363.1, 363.02, 250/363.06; 378/148

[56] References Cited

U.S. PATENT DOCUMENTS 5,077,479  12/1991  de la Barre et al. ................. 250/363.1
5,751,000   5/1998  McCroskey et al. ............... 250/363.02

*Primary Examiner*—Edward P. Westin
*Assistant Examiner*—Richard Hanig
*Attorney, Agent, or Firm*—John S. Beulick; Christian G. Cabou; Phyllis Y. Price

[57] ABSTRACT

A reduced field of view collimator for a nuclear imaging gamma camera is described. In one form, the collimator includes a gamma ray attenuating plate, several core plates, and a ramp member. The gamma ray attenuating plate is sized to substantially cover a scintillation crystal face, and includes an opening. The core plates extend from the attenuating plate at a periphery of the plate opening and define an outer periphery of a collimator core. The ramp member includes a ramp having a sloped surface, and is formed of gamma ray attenuating material. The ramp member is secured adjacent to at least one of the core plates so that the sloped surface extends substantially angularly with respect to the attenuating plate and the core plate.

20 Claims, 2 Drawing Sheets

GAMMA CAMERA COLLIMATOR

FIELD OF THE INVENTION

This invention relates generally to gamma cameras and more particularly, to facilitating improved image resolution of a large field of view gamma camera when utilizing a high energy tracer material.

BACKGROUND OF THE INVENTION

Gamma cameras typically are used for locating and displaying abnormalities in human glands and organs. More specifically, and with respect to using a gamma camera, gamma-ray-emitting tracer material is administered to a patient, and the tracer material is more greatly absorbed by the abnormality to be detected than by the other tissues. The gamma camera generates data, or an image, representing the distribution of such tracer material within the patient.

A conventional gamma camera includes a collimator and a scintillation crystal, or detector, responsive to radiation stimuli, i.e., gamma rays emitted by the patient. The collimator is positioned adjacent one face of the crystal, and includes a collimator core fabricated from gamma ray attenuating material and having a plurality of openings. An array of photomultiplier tubes typically are positioned adjacent an opposite face of the crystal.

In operation, the gamma rays emitted by the patient are projected toward the collimator core, and those rays projecting through the collimator openings interact with the crystal. The gamma rays impinging upon the collimator septa, i.e., impinging upon the attenuating material and not projecting through the collimator openings, are substantially attenuated and do not interact with the crystal.

Light events occur within the crystal at locations where the rays interact with the crystal lattice structure. The photomultiplier tubes, in response to the light events, produce individual analog outputs. In digital gamma cameras, the analog photomultiplier tube outputs are supplied to analog-to-digital converters (ADCs) which convert the analog outputs to digital signals.

To generate an image, a representation of the distribution of events in the crystal is generated by utilizing a matrix of storage registers whose elements are in one-to-one correspondence with elemental areas of the crystal. The crystal elemental areas are identified by coordinates. Each time a light event occurs in the crystal, the event coordinates are identified and the register in the storage register matrix corresponding to the identified event coordinates is incremented. The contents of a given register in the matrix is a number that represents the number of events that have occurred within a predetermined period of time within an elemental area of the crystal. Such number is directly proportional to the intensity of radiation emitted from an elemental area of the radiation field. The number stored in the register therefore is used to establish the brightness of a display picture element corresponding to the crystal elemental area. The distribution of a radiation field is displayed in terms of the brightness distribution of the display.

Gamma cameras sometimes are used in connection with ultra-high energy isotopes such as F-18. With the higher energy isotopes, improved images can be generated for certain body parts such as the brain and the heart. Although higher energy isotopes facilitate generation of improved images, the gamma rays generated using such high energy isotopes penetrate through known gamma camera collimators. Particularly, the higher energy gamma rays penetrate through the collimator septa and interact with the scintillation crystal. Therefore, rays which normally would be blocked at lower energies generate light events and thus reduce image contrast and diagnostic image quality.

To reduce such collimator penetration caused by high energy isotopes, collimators have been modified to include thicker collimator cores. Although such thicker collimators reduce gamma ray penetration from high energy isotopes, such collimators also weigh substantially more than collimators suitable for lower energies. With this increased weight, the collimator may exceed the weight bearing capacity of the gamma camera or other nuclear imaging system components such as a collimator cart or exchange system. In addition, changing collimators for different imaging sessions is more cumbersome with heavier collimators.

Accordingly, it would be desirable to provide a collimator which both reduces gamma ray penetration from ultra-high energy isotopes and does not weigh significantly more than typical collimators. It also would be desirable to provide such a collimator which does not significantly degrade image quality.

SUMMARY OF THE INVENTION

These and other objects may be attained by a collimator which, in one embodiment, includes a shielded collimator core positioned over only a portion of the scintillation crystal face. Particularly, in the one embodiment, the collimator includes a gamma ray attenuating plate sized to substantially cover the scintillation crystal face. Core plates extend from the attenuating plate at a periphery of an opening in the attenuating plate and define an outer periphery of the collimator core.

The collimator core includes collimator plates which define the paths through which gamma rays can freely pass. Importantly, the field of view of the core is less than the field of view of the camera. Such reduced size field of view is generally acceptable when higher energy isotopes are utilized because such higher energy isotopes are normally utilized for imaging smaller objects. Reducing the collimator field of view provides the advantage of reducing the weight of the collimator.

To prevent penetration of undesired gamma rays into the reduced field of view, ramp members are positioned adjacent, or proximate, selected core plates. Each ramp member includes a ramp having a sloped surface and is formed of gamma ray attenuating material. The ramp members are secured adjacent to at least one of the core plates so that the sloped surfaces extend substantially angularly with respect to the attenuating plate and the core plate. Each ramp member is sized and positioned to substantially prevent penetration, into the core, of gamma rays from outside the desired field of view.

The collimator described above is believed to improve the image quality of images generated from data collected using high energy isotopes. In addition, the collimator also is believed to be light weight as compared to known collimators used with high energy isotopes.

DETAILED DESCRIPTION

Figure 1:
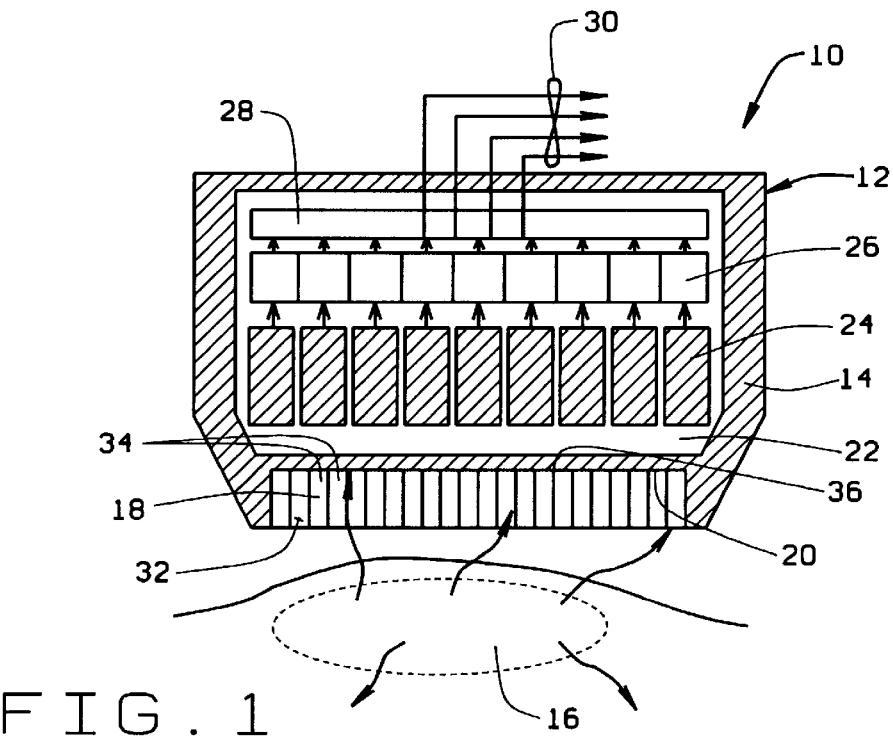
FIG. 1 is a cross-section schematic illustration of a known gamma camera.

FIG. 1 is a cross-section schematic illustration of a known gamma camera 10 including a detector head 12 having a housing 14 constructed of shielding material, such as lead or steel, for shielding the interior of head 12 from background radiation and from radiation within the patient's body, generally designated at 16, outside the field of view of detector head 12. Detector head 12 further includes a collimator 18 and a scintillation crystal 20. Collimator 18 transfers a gamma ray image of a radioactivity distribution from patient 16 onto scintillation crystal 20. Upon reception of gamma rays, a light event, or incident, occurs, thus causing scintillating crystal 20 to emit a burst of light photons. The light photons emitted at the scintillation points in crystal 20 following absorption of the individual gamma rays pass through a transparent light guide 22 and are shared among a closely-packed array of photomultiplier tubes (PMTs) 24. The total electric charge in the electrical pulses from the output of photomultiplier tubes 24 is proportional to the mean number of photons received by the photocathode of each photomultiplier tube 24. These pulses contain information on both the energy absorbed within crystal 20 from the gamma rays and the position of the scintillation point, or event. The pulses are then amplified and fed to analog-to-digital converters (ADCs) 26. In one embodiment, the signals from selected tubes 24 may be summed prior to being provided to ADCs 26. ADCs 26 convert the PMT analog outputs to digital signals, which are then processed by circuitry 28. Particularly, camera 10 produces signals on output lines 30 which are transmitted to a processing unit for generating an image for display on, for example, a cathode ray tube. The signals output on lines 30 also typically are stored in the memory of a computer (not shown).

Collimator 18 includes a collimator core 32 which defines a field of view (FOV) of gamma camera 10. Collimator core 32 includes a plurality of plates fabricated from gamma ray attenuating material and defining a plurality of passages, or openings, 34. Collimator core 32 substantially extends across an entire face 36 of crystal 20.

Collimator 18 generally is provided to prevent rays propagating along an angular path with respect to passages 34 from interacting with crystal 20. By blocking such rays from crystal 20, image quality is believed to be improved because erroneous data which result from such rays is not generated. Although collimator 18 is sufficiently effective with lower energy isotopes which have been used in the past, such collimator 18 may not sufficiently block, or attenuate, rays generated by higher energy isotopes. For example, the isotope F-18 emits high energy gamma rays which may penetrate through the collimator plates and impinge upon crystal 20, even if such rays are at an angular orientation with respect to collimator core passages 34. Therefore, it is possible that in addition to the true data obtained, error data also may be generated.

To reduce undesired radiation penetration caused by high energy isotopes, the thickness of the material from which collimator 18 is fabricated may be increased across the entire field of view, i.e., across entire crystal face 36. However, and as described above, the increased weight associated with such a collimator typically is undesirable.

Figures 2, 3:
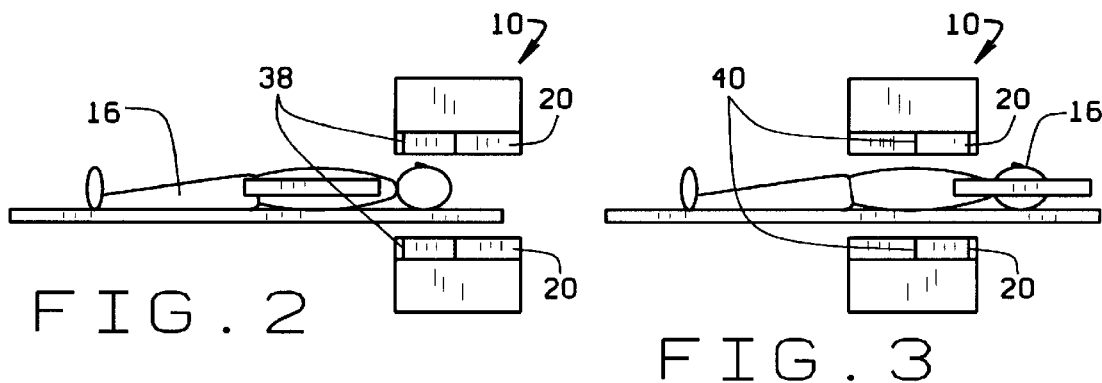
FIG. 2 is an illustration of the gamma camera shown in FIG. 1 oriented to perform brain imaging.
FIG. 3 is an illustration of the gamma camera shown in FIG. 1 oriented to perform cardiac imaging.

With respect to imaging high energy isotopes for a portion of a body, FIG. 2 illustrates gamma camera 10 oriented to perform brain imaging. Typically, when generating images of a brain, only light events occurring in the portion of crystal 20 aligned with collimator portion 38 represent true image data.

Similarly, FIG. 3 illustrates gamma camera 10 oriented to perform cardiac imaging. Typically, when generating images of the cardiac region, only light events occurring in the portion of crystal 20 aligned with collimator portion 40 represent true image data.

In accordance with one embodiment of the present invention, a substantially light weight reduced field of view collimator is provided which reduces undesired radiation penetration into and through the collimator core. Particularly, the collimator includes ramp members adjacent interfaces between a shield and the collimator core. The ramp members substantially prevent undesired gamma rays from impinging upon the camera crystal in the reduced field of view. The present invention is specifically directed to an improved collimator.

Figure 4:
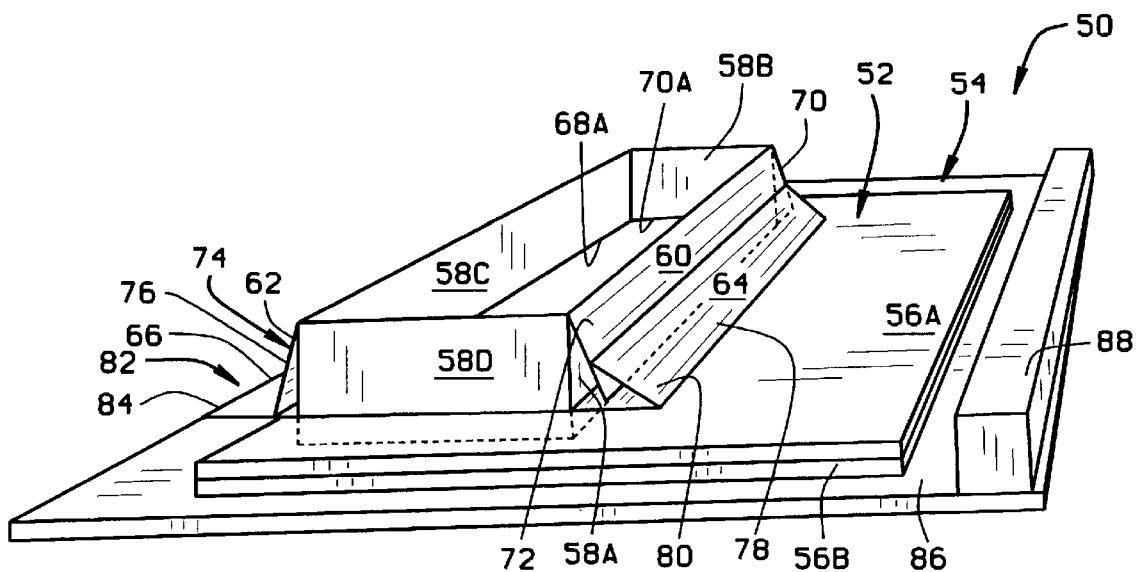
FIG. 4 is a perspective isometric illustration of a collimator in accordance with one embodiment of the present invention.

Particularly, FIG. 4 is a perspective isometric illustration of a reduced field of view collimator 50 in accordance with one embodiment of the present invention. Collimator 50 includes an insert 52 secured to a steel support ring 54. Insert 52 includes gamma ray attenuating plates 56A and 56B, core plates 58A, 58B, 58C and 58D, and ramp members 60, 62, 64 and 66. Gamma ray attenuating plate 56A is substantially rectangular and includes an opening 68A having a periphery 70A. Similarly, gamma ray attenuating plate 56B is substantially rectangular and includes an opening 68B having a periphery 70B. Gamma ray attenuating plate 56B is coupled to gamma ray attenuating plate 56A, and openings 68A and 68B in respective attenuating plates 56A and 56B are substantially aligned. Attenuating plates 56A and 56B may be sized, for example, to substantially extend across crystal face 36 (FIG. 1).

Core plates 58A, 58B, 58C and 58D are secured to attenuating plates 56A and 56B at peripheries 70A and 70B of attenuating plate openings 68A and 68B, and extend from attenuating plates 56A and 56B. Core plates 58A, 58B, 58C and 58D define an outer periphery of the collimator core and, as is known in the art, a plurality of collimator plates are positioned in the core to define gamma ray propagation passages through the core.

Ramp member 60 is secured adjacent to core plate 58A, and includes a ramp 70 having a sloped surface 72 extending angularly with respect to attenuating plate 56A and core plate 58A. Similarly, ramp member 62 is secured adjacent core plate 58C, and includes a ramp 74 having a sloped surface 76 extending angularly with respect to attenuating plate 56A and core plate 58C. Ramp member 64 is secured adjacent ramp member 60, and includes a ramp 78 having a sloped surface 80 extending angularly with respect to attenuating plate 56A and sloped surface 72 of ramp member 60. Similarly, ramp member 66 is secured adjacent ramp member 62, and includes a ramp 82 having a sloped surface 84 extending angularly with respect to attenuating plate 56A and sloped surface 76 of ramp member 62.

Insert 52 is secured to support ring 54, and core plates 58A, 58B, 58C and 58D extend through an opening in support ring 54. Particularly, support ring 54 includes a steel plate 86 having an opening, and is coupled to insert 52 so that a periphery of the steel plate opening is substantially aligned with the peripheries 70A and 70B of attenuating plate openings 68A and 68B. Support ring 54 includes a counter balance 88, and counter balance 88 is sized to substantially offset the size and weight of the collimator core and ramps 60, 62, 64 and 66 positioned adjacent the collimator core.

Figure 5:
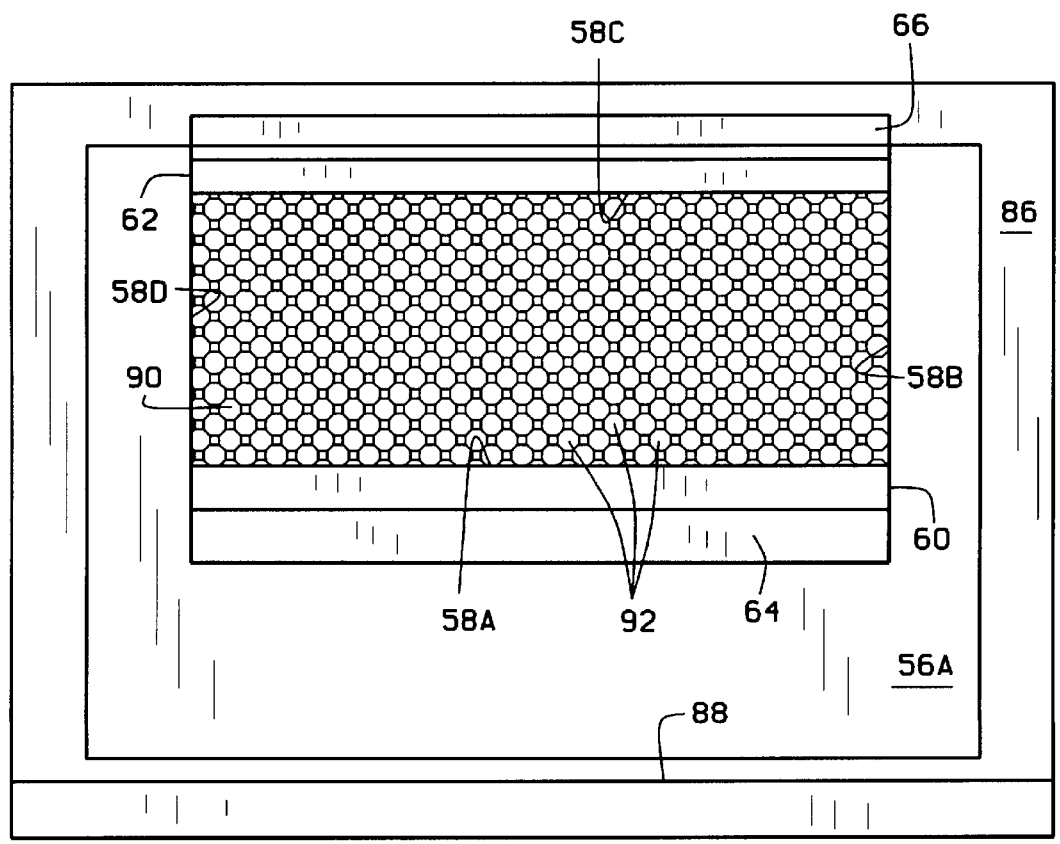
FIG. 5 is a top view schematic illustration of the collimator shown in FIG. 4.

FIG. 5 is a top view schematic illustration of collimator 50, including collimator core 90. A plurality of passages 92 extend through core 90, and the periphery of core 90, as explained above, is defined by core plates 58A, 58B, 58C and 58D. Ramp members 60, 62 and 64 each are coupled to attenuating plate 56A. Ramp member 66 is coupled to steel plate 86 adjacent ramp member 62 and facilitates securing support ring 54 to insert 52.

Figure 6:
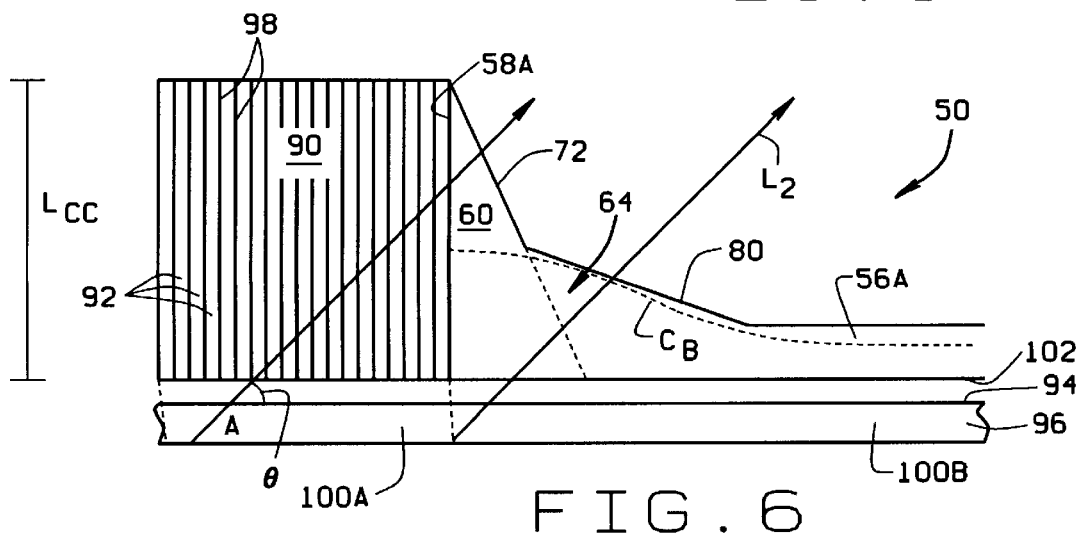
FIG. 6 is a partial side view graphic illustration of the collimator shown in FIG. 4 positioned adjacent a scintillation crystal face of a gamma camera.

FIG. 6 is a partial side view graphic illustration of collimator 50 positioned adjacent a face 94 of a gamma camera scintillation crystal 96. Crystal face 94 may, for example, be face 36 of scintillation crystal 20 (FIG. 1). As is more clearly shown in FIG. 6, collimator core 90 includes a plurality of gamma ray attenuating plates 98 positioned to define passages 92 extending through core 90. Collimator core 90 of collimator 50 only extends across a first portion 100A of crystal face 94. Attenuating plate 56A extends across a remaining portion 100B of crystal face 94. Ramp members 60 and 64, as shown, are coupled to attenuating plate 56A and, as the following discussion demonstrates, facilitate attenuating, or blocking, gamma rays outside the desired field of view.

Particularly, consider a line $L_1$ at an angle theta extending from a point A on crystal face 94 of the gamma camera outward and through collimator core 90. If collimator core 90 was infinite in extent, i.e., extended across substantially entire crystal face 94, then all lines extending from crystal face 94 at angle theta would provide a substantially similar path length (on average) through the attenuating material of collimator core 90. However, because collimator core 90 is not infinite in extent, the path length becomes truncated when for a given angle the point on crystal 96 is too near an edge, i.e., a core plate 58A, 58B, 58C or 58D, of collimator core 90. For example, line $L_1$ extends through core plate 58A of collimator core 90, and thus a gamma ray along line $L_1$ does not project through one of collimator openings 92, and does not project through an entire length $L_{cc}$ of collimator core 90. Gamma rays along line $L_1$, if not blocked, would yield a contamination from penetration higher than that from gamma rays which are attenuated by the full attenuation path length, i.e., gamma rays which project through entire length $L_{cc}$ of collimator core 90. To reduce such higher penetration from gamma rays along line $L_1$, ramp member 60 is positioned adjacent collimator core 90, and is sized to provide shielding which is substantially the same as if collimator core 90 was extended along line $L_1$. Particularly, ramp member 60 is sized and positioned to provide a minimum attenuation path length along line $L_1$ where such minimum path length is substantially the same path length as an extended collimator core 90 would provide. Ramp member 62 is similarly sized and is positioned adjacent core plate 58C to provide shielding for radiation extending through core plate 58C but not through entire length $L_{cc}$ of collimator core 90.

Both ramp members 60 and 64 facilitate attenuating gamma rays which would otherwise impinge upon first portion 100A of crystal face 94 but do not project through any portion of collimator core 90. For example, consider line $L_2$ shown in FIG. 6. Gamma rays extending along line $L_2$ project through a gap 102 which exists between crystal 96 and collimator core 90. To adequately shield crystal face 94 from such gamma rays, the shielding thickness of collimator 50 adjacent core 90 is selected so that any ray projected along line $L_2$ passes through a minimum attenuation path to reach first portion 100A of crystal face 94, i.e., collimator 50 includes shielding so that rays along line $L_2$ are substantially blocked from impacting crystal face 94 within portion 100A. Such minimum attenuation path is illustrated by curve $C_B$. Ramp member 64 is selected to substantially approximate curve $C_B$ adjacent ramp member 60. Particularly, ramp member 64 is positioned adjacent ramp member 60 so that sloped surface 80 of ramp member 64 substantially approximates curve $C_B$ between sloped surface 72 of ramp member 60 and attenuating plate 56. Ramp member 66 is similarly sized and positioned adjacent ramp member 62.

Attenuating plate 56A substantially protects crystal face 94 against excessive scatter. Particularly, attenuating plate 56A substantially reduces gamma rays impacting scintillation crystal 96 outside first portion 100A, i.e., outside the area of interest. Attenuating plate 56A is chosen to be a minimum acceptable attenuation thickness to keep an overall count rate, i.e., an overall number of light incidents, at an acceptable level, and extends over crystal face 94 for all areas which would dip below such minimum thickness.

Gamma ray attenuating plates 56A and 56B are fabricated from gamma ray attenuating material, such as lead. Similarly, each ramp member 60, 62, 64 and 66 includes a substantially triangular cross-section and is formed from gamma ray attenuating material such as lead. However, each ramp member 60, 62, 64 and 66 do not have identical cross-sectional areas.

Collimator 50 is believed to improve the image quality of images generated from data collected using high energy isotopes. Particularly, collimator 50 reduces the field of view of a camera, and reduces undesirable radiation penetration within the reduced field of view. Collimator 50 also is believed to be light weight as compared to known collimators used with high energy isotopes.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the gamma camera described herein is a digital camera. Many other cameras, including even cameras other than scintillation cameras such as solid state cameras, may be used. In addition, while the collimator described herein included four ramp members, either more or fewer ramp members may be used. Similarly, while such collimator included an attenuating plate having an opening with a substantially rectangular periphery, such attenuating plate may include openings having non-rectangular peripheries, i.e., circular or polygonal peripheries. Accordingly, the spirit and scope of the invention are to be limited only by the terms of the appended claims.

We claim:

1. A collimator for a gamma camera, said collimator comprising:

a gamma ray attenuating plate having an opening therein;

at least one core plate extending from said attenuating plate, said one core plate coupled at a periphery of said attenuating plate opening defining a collimator core having at least one core passage extending substantially through said core; and at least one first ramp member, said first ramp member secured adjacent to said one core plate, said first ramp member comprising a ramp having a sloped surface extending angularly with respect to said attenuating plate and said one core plate.

2. A collimator in accordance with claim 1 further comprising a second ramp member secured adjacent to said first ramp member, said second ramp member comprising a ramp having a sloped surface extending angularly with respect to said attenuating plate and said first ramp member.

3. A collimator in accordance with claim 1 further comprising a second first ramp member secured adjacent to a second of said core plates, said second first ramp member comprising a ramp having a sloped surface extending angularly with respect to said attenuating plate and said second core plate.

4. A collimator in accordance with claim 1 wherein said first ramp member comprises substantially gamma ray attenuating material.

5. A collimator in accordance with claim 1 wherein said first ramp member comprises a substantially triangular cross-section.

6. A collimator in accordance with claim 1 further comprising a support ring coupled to said attenuating plate.

7. A collimator in accordance with claim 6 wherein said collimator comprises a second ramp member secured adjacent to said first ramp member, said second ramp member comprising a ramp having a sloped surface extending angularly with respect to said support ring and said first ramp member.

8. A collimator in accordance with claim 6 wherein said support ring comprises a steel plate having an opening therein.

9. A collimator in accordance with claim 6 wherein said support ring further comprises a counter balance.

10. A collimator in accordance with claim 1 further comprising at least one collimator core attenuating plate coupled to said one said core plate defining a plurality of core passages.

11. A method of constructing a collimator for a gamma camera, the collimator including a support ring and an insert, the insert including a gamma ray attenuating plate having an opening therein, at least one core plate extending from the attenuating plate at a periphery of the attenuating plate opening, and at least one first ramp member having a sloped surface, said method comprising the steps of:

coupling the one core plate to the attenuating plate periphery to define a collimator core having at least one core passage extending substantially through said core;

securing the first ramp member adjacent to the one core plate so that the sloped surface of the first ramp member extends angularly with respect to the attenuating plate and the one core plate; and securing the support ring to the insert.

12. A method in accordance with claim 11 wherein the collimator insert includes a second ramp member having a sloped surface, and wherein said method further comprises the step of securing the second ramp member adjacent to the first ramp member so that the sloped surface of the second ramp member extends angularly with respect to the attenuating plate and the first ramp member.

13. A method in accordance with claim 11 wherein the collimator insert includes a second core plate and a second first ramp member, the second first ramp member having a sloped surface, and wherein said method further comprises the step of securing the second first ramp member adjacent to the second core plate so that the sloped surface of the second first ramp member extends angularly with respect to the attenuating plate and the second core plate.

14. A method in accordance with claim 11 wherein the collimator insert includes a second ramp member having a sloped surface, and wherein securing the support ring to the insert comprises the step of securing the second ramp member adjacent to the first ramp member so that the sloped surface of the second ramp member extends angularly with respect to the support ring and the first ramp member.

15. A collimator for a gamma camera, said collimator comprising:

a gamma ray attenuating plate having an opening therein;

at least one core plate extending from said attenuating plate, each said core plate coupled at a periphery of said attenuating plate opening;

at least one first ramp member, said first ramp member secured adjacent to said one core plate, said first ramp member comprising a ramp having a sloped surface extending angularly with respect to said attenuating plate and said one core plate; and a second ramp member secured adjacent to each said first ramp member, said second ramp member comprising a ramp having a sloped surface extending angularly with respect to said attenuating plate and said first ramp member.

16. A collimator in accordance with claim 15 wherein said first ramp member comprises substantially gamma ray attenuating material.

17. A collimator in accordance with claim 15 wherein said first ramp member comprises a substantially triangular cross-section.

18. A collimator in accordance with claim 15 further comprising a support ring coupled to said attenuating plate.

19. A collimator in accordance with claim 18 wherein said support ring comprises a counter balance.

20. A collimator in accordance with claim 15 further comprising at least one collimator core attenuating plate coupled to said one core plate defining a plurality of core passages.

\* \* \* \* \*